J. HELSEL.
ANTISKID TIRE CHAIN DEVICE.
APPLICATION FILED APR. 21, 1920.

1,404,856.

Patented Jan. 31, 1922.
3 SHEETS—SHEET 1.

WITNESSES:
Julia A. Helsel
R. J. Fitzgerald

INVENTOR
Josiah Helsel.
BY William R. Coley
ATTORNEY

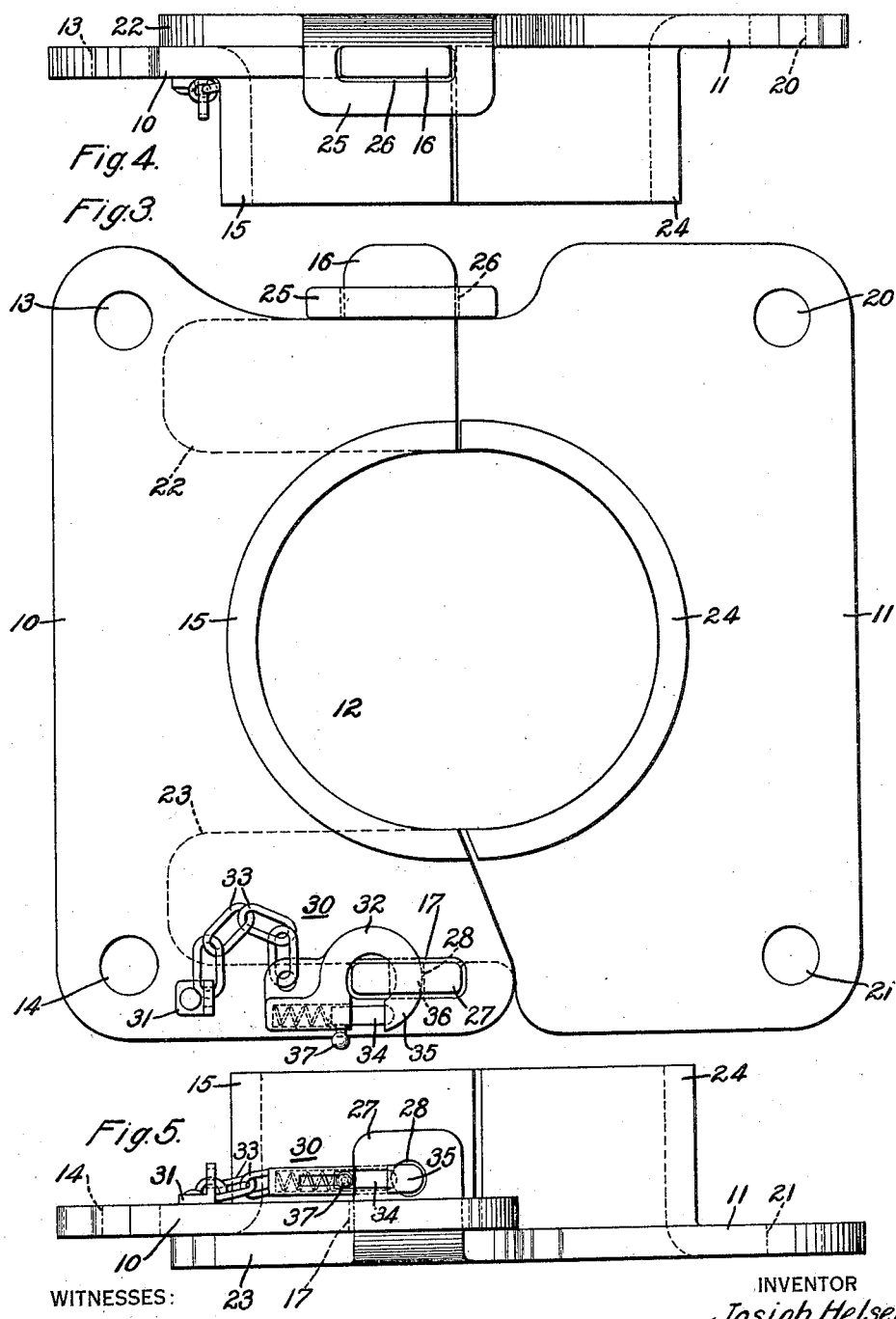

J. HELSEL.
ANTISKID TIRE CHAIN DEVICE.
APPLICATION FILED APR. 21, 1920.

1,404,856.

Patented Jan. 31, 1922.
3 SHEETS—SHEET 3.

WITNESSES:
Julia A. Helsel
R. J. Fitzgerald

INVENTOR
Josiah Helsel.
BY
William R. Coley
ATTORNEY

UNITED STATES PATENT OFFICE.

JOSIAH HELSEL, OF PITTSBURGH, PENNSYLVANIA.

ANTISKID-TIRE-CHAIN DEVICE.

1,404,856.  Specification of Letters Patent.  Patented Jan. 31, 1922.

Application filed April 21, 1920. Serial No. 375,481.

*To all whom it may concern:*

Be it known that I, JOSIAH HELSEL, a citizen of the United States, and a resident of Pittsburgh, in the county of Allegheny and State of Pennsylvania, have invented a new and useful Improvement in Antiskid-Tire-Chain Devices, of which the following is a specification.

My invention relates to anti-skidding means for motor trucks, passenger automobiles and the like, and it has special relation to detachable tire-chain devices.

One object of my invention is to provide a device of the above-indicated character which shall be adapted for ready and quick attachment and removal and which, while possessing the necessary strength and durability for performing the desired work in connection with even the heaviest motor-truck wheels, shall nevertheless be relatively small and inexpensive in construction.

A further object of my invention is to provide an improved tire-chain device which shall be constructed of two parts that may be quickly and easily assembled upon an automobile wheel and which shall be readily latched in the assembled position.

Another object of my invention is to provide an appliance of the character set forth wherein a two-part device is detachably clamped around a wheel spoke and two chains, spaced apart by a suitable distance, may be permanently secured to each of the parts in question.

My invention may best be understood by reference to the accompanying drawings, wherein—

Fig. 3 is a view, in front elevation, of an assembled device of my invention, with the exception of the sections of chain;

Fig. 4 and Fig. 5 are views, in end elevation, of the device shown in Fig. 3.

Figure 1:
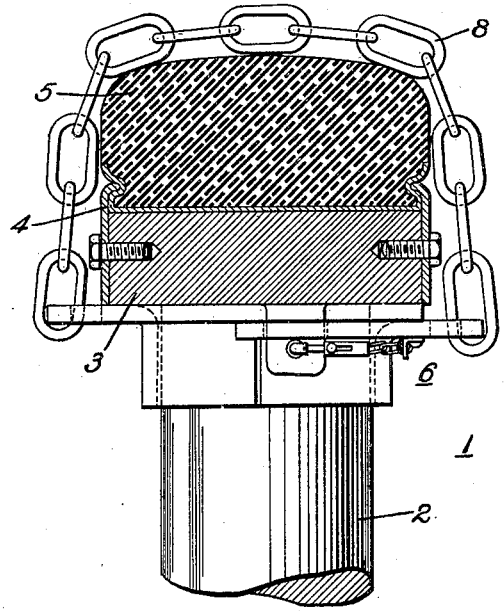
Figure 1 is a sectional view, taken along a radial line, of a motor-truck wheel to which my improved anti-skid tire-chain device is attached.
Figure 2:
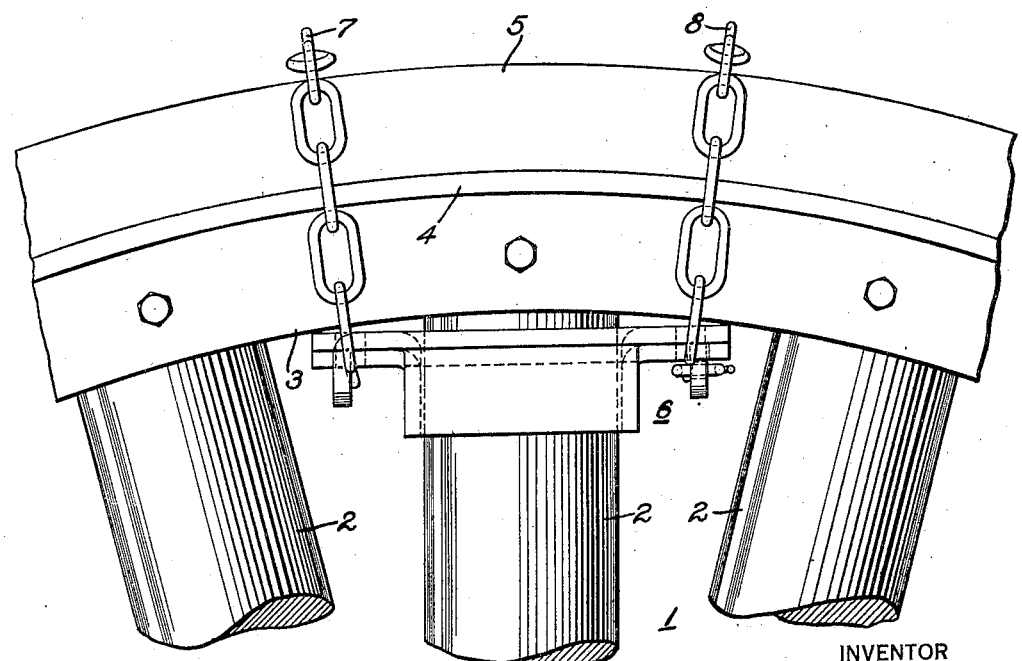
Fig. 2 is a fragmentary view, in elevation, taken at right angles to the view of Fig. 1.

Referring to Fig. 1 and Fig. 2 of the drawings, the structure here shown comprises a motor-truck wheel 1, which is provided with any usual number of spokes or arms 2 that terminate in, or are suitably fastened into, a felly or rim member 3 in accordance with customary practice; a tire-holding trough or band 4 in which is located a rubber tire 5 of any well-known type, which may be either of the pneumatic or of the solid-rubber form.

My anti-skid tire-chain device 6 is detachably fastened around preferably every other spoke, and a pair of chain sections 7 and 8 are fastened to corresponding ends of the device 6, the chains extending transversely around the tire 5 with the desired degree of looseness, as will be understood from the usual practice for anti-skid chains.

My tire-chain device 6, as applied to motor trucks, is illustrated in detail in Fig. 3, Fig. 4 and Fig. 5 and comprises two members 10 and 11 which overlap and mutually interlock, in a manner to be set forth, to provide an assembled appliance of substantially rectangular shape and which is practically symmetrical in form with respect to the centrally-located opening 12 which is adapted to fit around the wheel spoke 2.

The member 10 is provided with a plurality of holes or apertures 13 and 14 near opposite outer corners thereof for the purpose of permanently receiving the ends of the corresponding tire-chains 7 and 8 and, furthermore, embodies a curved rim or flange 15 which extends upwardly from the plane of the paper, as viewed in Fig. 3, and away from the felly 3, as viewed in Fig. 1 and Fig. 2. This rim or flange 15 is preferably integrally formed with the remainder of the member 10 for the purpose of enclosing substantially one-half of the wheel spoke. Near one inner corner of the member 10, a pin or tongue 16 extends outwardly in the plane of the member, while, near the other inner corner, a slot or aperture 17 is provided for interlocking purposes to be set forth.

The complementary member 11 is also provided with a plurality of holes or apertures 20 and 21, at opposite outer corners, for receiving the remaining ends of the two tire-chains 7 and 8, and a pair of parallel-extending arms 22 and 23 project beyond the line of split of the device and underneath the member 10, as clearly illustrated in Fig. 3. A rim or flange 24, curved in form and extending outwardly from the main plane of the member 11, as does the other flange member 15, is shaped to enclose substantially one-half of the wheel spoke, whereby the two rim or flange members 15 and 24 surround the wheel spoke throughout practically the entire periphery thereof.

Opposite the pin 16 on the member 10, a bent ear or lug 25, having a slot 26 to receive the pin 16, is provided upon the member 11, thus extending practically at right angles to the plane of the body of the member 11. In this way, the two members 10 and 11 are detachably fastened at the one side.

On the opposite side of the device, another lug or tongue 27 extends in the opposite direction from the lug 25 and is provided with an opening 28 for latching purposes to be set forth. The lug 27 extends through the slot 17 in the member 10 and the hole 28 is located above the plane of the member 10. Thus, the male fastening members 16 and 27 of the illustrated pin-and-slot connections on the members 10 and 11 extend at right angles with respect to each other. The reasons for, and advantages of, this construction will be brought out later.

In other words, the two main members 10 and 11 are mutually interlocked by means of the peculiarly arranged pin-and-slot connections in two directions or planes at substantially right angles. Thus, the pin 16 is first inserted in place in the direction or plane of the main members 10 and 11, after which the other pin 27 is inserted in position in a direction or plane at substantially right angles to the plane of the main members, as more fully hereinafter set forth.

A latching device 30 is associated with the member 10 near the tongue 27 and the slot 17 for the purpose of detachably maintaining the corresponding sides of the members 10 and 11 in contact. In this way, it is ensured that the entire device cannot work apart, since the pin 16, in conjunction with the slotted tongue 25, serves to securely prevent any accidental detachment of the corresponding sides of the device, as will be readily appreciated.

The latching device 30 may comprise a staple or eye 31 that is fastened to the member 10 near the aperture 14 and to which a spring-hook device 32 may be flexibly attached by means of a plurality of links 33. The hook device 32 may be of the well-known type that is employed for attachment to horse-bridles and comprises, in general, a spring-pressed pin 34 that normally abuts against the hook portion 35 to form a closed loop. After the parts 10 and 11 have been assembled, the hook device 32 may be inserted through the hole 28 in the tongue 27, care being taken to turn the hook so that the solid body portion 36 finally rests within the hole 28. Consequently, the two members 10 and 11 may be securely fastened together during periods of use of the anti-skid device, but a ready detachment of the members may be obtained at any time by merely actuating a knob or handle 37 to move the pin 34 to a position permitting removal of the hook device 32.

With the parts assembled as shown in Fig. 1, Fig. 2 and Fig. 3, the device may be taken apart or removed from the tire as follows. In the first place, the latching device 30 is actuated as just described to withdraw the hook 32 from the hole 28. The member 10 is then lifted upwardly, as viewed in Fig. 3, until the tongue 27 of the member 11 is cleared. A clockwise movement of the member 10 to withdraw the tongue 16 from the slot 26 is then executed. Thus, the two members 10 and 11 are readily separated by three manual movements without requiring the use of any tools or the unscrewing of bolts or other laborious and time-consuming methods. After the members 10 and 11 have been detached, the entire device, including the chains 7 and 8, may be removed as a unit and stored under a seat or in any other suitable receptacle.

Whenever it is desired to install the device, the chains are laid over the tire and the two members 10 and 11 are clamped around a wheel spoke by first sliding the pin 16 through the slot 26 and then placing the slot 17 over the tongue 27. The latching device 30 is then grasped and hooked in proper position, as previously described.

The procedures outlined above for removal or installation of the devices are repeated with regard to every second spoke of the wheel, whereby a substantially even spacing of chains and a sufficient number thereof are provided, as will be evident.

Figure 7:
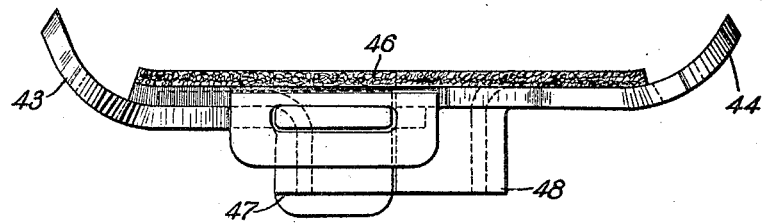
Fig. 6, Fig. 7 and Fig. 8 are views, respectively corresponding to Fig. 3, Fig. 4 and Fig. 5, of a modification of my invention that is particularly adapted for passenger automobiles.
Figure 8:
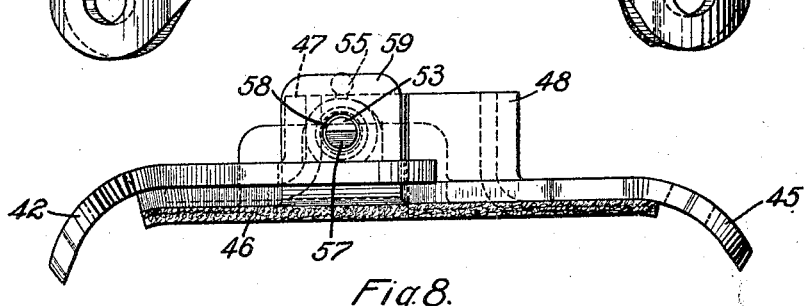

The members 10 and 11, in the form just described, may be practically flat, by reason of the relatively wide fellies that are customarily provided in wheels for heavy motor trucks. However, for passenger vehicles, wherein the wheel width is usually less than that of truck wheels, and where, moreover, the felly is often of curved shape, I provide a modified form of tire-chain device that is illustrated in Fig. 6, Fig. 7 and Fig. 8.

In this case, a considerable amount of material has been eliminated to provide as light and small a device as is consistent with the necessary strength and durability. The device illustrated in the figures enumerated comprises a pair of interlocking members 40 and 41 which correspond, in every essential particular, to the members 10 and 11 that were described above. However, the members 40 and 41, instead of combining to provide a substantially rectangular device, when viewed in plan, have a plurality of arms 42 and 43, and 44 and 45, respectively, which are provided with the necessary holes for permanent connection to the chain ends.

Since the method of fastening and, therefore, the processes of detachment or assembly of the parts 40 and 41 follow those set forth for the members 10 and 11, it is not believed that any detailed description thereof need be given here, outside of the following points. The various arms 42 to 45, inclusive, are preferably bent toward the tire to facilitate assembly, and a layer of felt, or other cushioning and protective material 46, is provided on the inner face of the member 41, the felt further extending outwardly within the confronting rims or flanges 47 and 48 of the respective members 40 and 41. The purpose of this layer of soft material is to prevent the possibility of marring or in any way defacing the spokes and felly of the passenger-car wheels.

Figure 6:
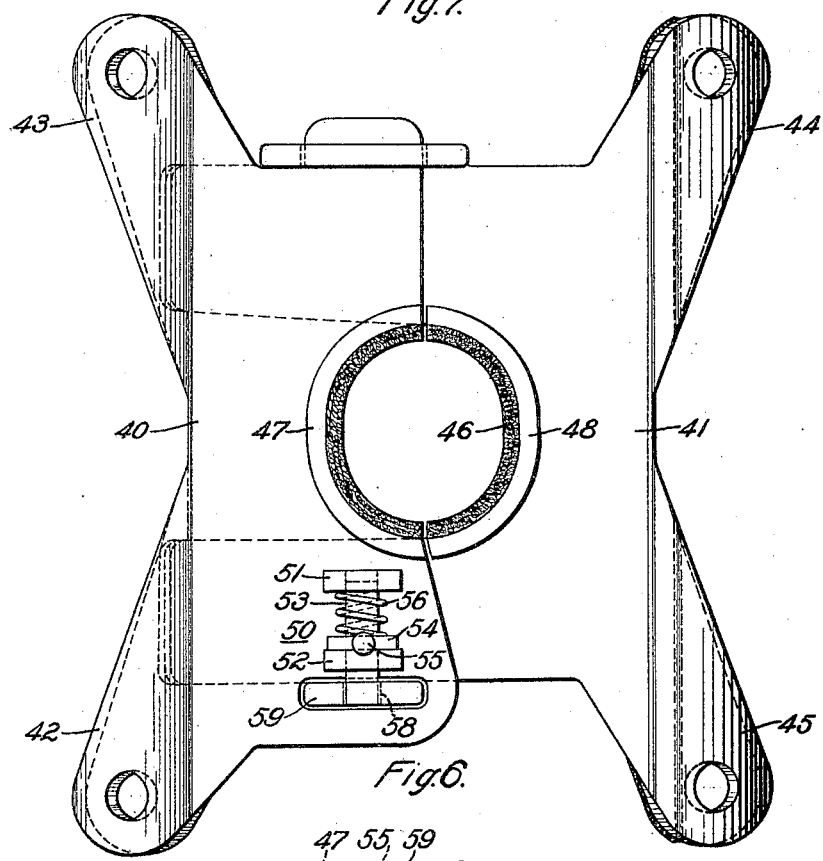

The members 40 and 41 may be detachably fastened by means of the previously-described latching device 30 or the form of appliance 50, illustrated in Fig. 6, may be employed. This modified form may comprise a plurality of tabs or tongues 51 and 52 which are located in alinement with respect to a pin member 53 that extends through suitable holes in the two tabs. The tabs 51 and 52 may be either struck up from the material of the member 40, in accordance with a well-known custom, or may be separate members that are screwed or otherwise fastened into the body of the member 40. A collar 54 and a small handle or knob 55 are provided at intermediate points of the pin 53, and a helical spring 56 is disposed around the pin 53, the ends of the spring bearing against the tab 51 and the collar 54. In this way, the tapered end 57 of the pin 53 is biased to enter the aperture or hole 58 in the bent tongue 59 of the member 40.

To install the device, the assembly of parts 40 and 41 on the wheel spoke is accomplished in a manner similar to that previously described. The latching device 50 will then automatically lock the parts together by reason of the provision of the tapered end 57, which is temporarily moved out of the way by the tongue 59 until the parts are in their final location, when the pin is automatically inserted in the hole 58 by means of the spring 56.

In this way, also, therefore, a readily detachable means for fastening the parts of the device together is provided, and, moreover, the action thereof is automatic, which is not the case in the operation of the previously-described latching device 30.

It will be seen that I have thus provided a two-part chain-holding device for automobiles which may be readily assembled upon, or removed from, a wheel spoke and which is either automatically or manually latched in position. The device readily lends itself to application upon either heavy motor trucks or any type of passenger automobile and, if manufactured from sheet steel of one-quarter inch in thickness, will be strong enough to successfully meet all operating conditions. In this connection, it should be noted that such strain as is imposed upon the parts of the device is transmitted through pin-and-slot connections provided with pins or male members extending in different directions and located at opposite sides of the device, whereby the danger of shearing or distortion of parts is greatly diminished.

The two parts of the chain-holding device are preferably stamped out by means of suitable dies and the remaining work upon the interlocking members is of a simple nature, so that the apparatus may be readily manufactured economically in large quantities.

One great advantage of my present invention over the anti-skid devices that are composed entirely of chains, two of which extend entirely around the wheel on opposite sides thereof, resides in the fact that the breakage of one of my chain sections does not affect the operation of the other sections and, moreover, the broken chain sections will usually be too short to strike the wheel guard. On the other hand, the breakage of the long chain section, in the type of anti-skid device mentioned above, means that the entire effect of the device is either lost or diminished to a very material degree.

I do not wish to be restricted to the specific structural details or arrangement of parts herein set forth, as various modifications thereof may be made within the spirit and scope of my invention. I desire, therefore, that anly such limitations shall be imposed thereon as are indicated in the appended claims.

I claim as my invention:

1. In an anti-skid tire-chain device for vehicles, the combination with a plural-part device for fastening around a wheel spoke, and provided with mutual interlocking means comprising male and female members, the former extending in a plurality of planes, of a plurality of parallel-extending chain sections secured to different parts of said device.

2. In an anti-skid tire-chain device for vehicles, the combination with a two-part device provided with mutual interlocking means comprising pin-and-slot connections, the pins extending in two directions at substantially right angles the one to the other, of a plurality of chain sections secured to opposite sides of said device.

3. In an anti-skid tire-chain device for vehicles, the combination with a plural-part device for fastening around a wheel spoke, and provided with mutual interlocking means comprising male and female members, the former extending in a plurality of intersecting planes, of means for temporarily latching the parts of said device in position.

4. In an anti-skid tire-chain device for vehicles, the combination with a two-part device provided with mutual interlocking means comprising pin-and-slot connections, the pins extending in two directions at substantially right angles the one to the other, of means for temporarily latching the parts of said device in assembled position.

5. A chain-holding device for automobile wheels comprising two parts having pin-and-slot connections, the pins extending in directions substantially at right angles the one to the other.

6. A chain-holding device for automobile wheels comprising a plurality of parts having a plurality of pin-and-slot connections provided with pins operative in intersecting planes, and means for temporarily latching the parts of said device.

7. A chain-holding device for automobile wheels comprising two parts having pin-and-slot connections, said parts being respectively provided with pins operative in directions substantially at right angles the one to the other, and means for temporarily latching the parts of said device.

8. A chain-holding device for automobile wheels comprising a plurality of parts collectively having a plurality of pin-and-slot connections, said parts being respectively provided with pins extending in intersecting planes, and a spring-pressed latching device associated with one of said connections.

9. A chain-holding device for automobile wheels comprising two parts having pin-and-slot connections provided with pins respectively extending in the main plane of said device and substantially at right angles therewith, and a spring-pressed latching device associated with the connection having the pin extending at right angles with the main plane of the device.

10. A chain-holding device for automobile wheels comprising a member having a slotted bent lug at one side and a bent tongue at another side, and a second member having a tongue in the main plane of the member for co-acting with said slotted lug and having a slot for co-operating with said bent tongue.

11. A chain-holding device for automobile wheels comprising a plurality of parts having a plurality of detachable pin-and-slot connections, the pins thereof extending in intersecting planes.

12. A chain-holding device for automobile wheels comprising a plurality of spoke-enclosing parts provided with mutually detachable connections severally comprising male and female members, the male members extending in intersecting planes.

In testimony whereof, I have hereunto subscribed my name this nineteenth day of April, 1920.

JOSIAH HELSEL.